Sept. 26, 1967   B. F. LATHAM, JR   3,344,051
METHOD FOR THE PRODUCTION OF CARBON BLACK
IN A HIGH INTENSITY ARC
Filed Dec. 7, 1964                                                3 Sheets-Sheet 1
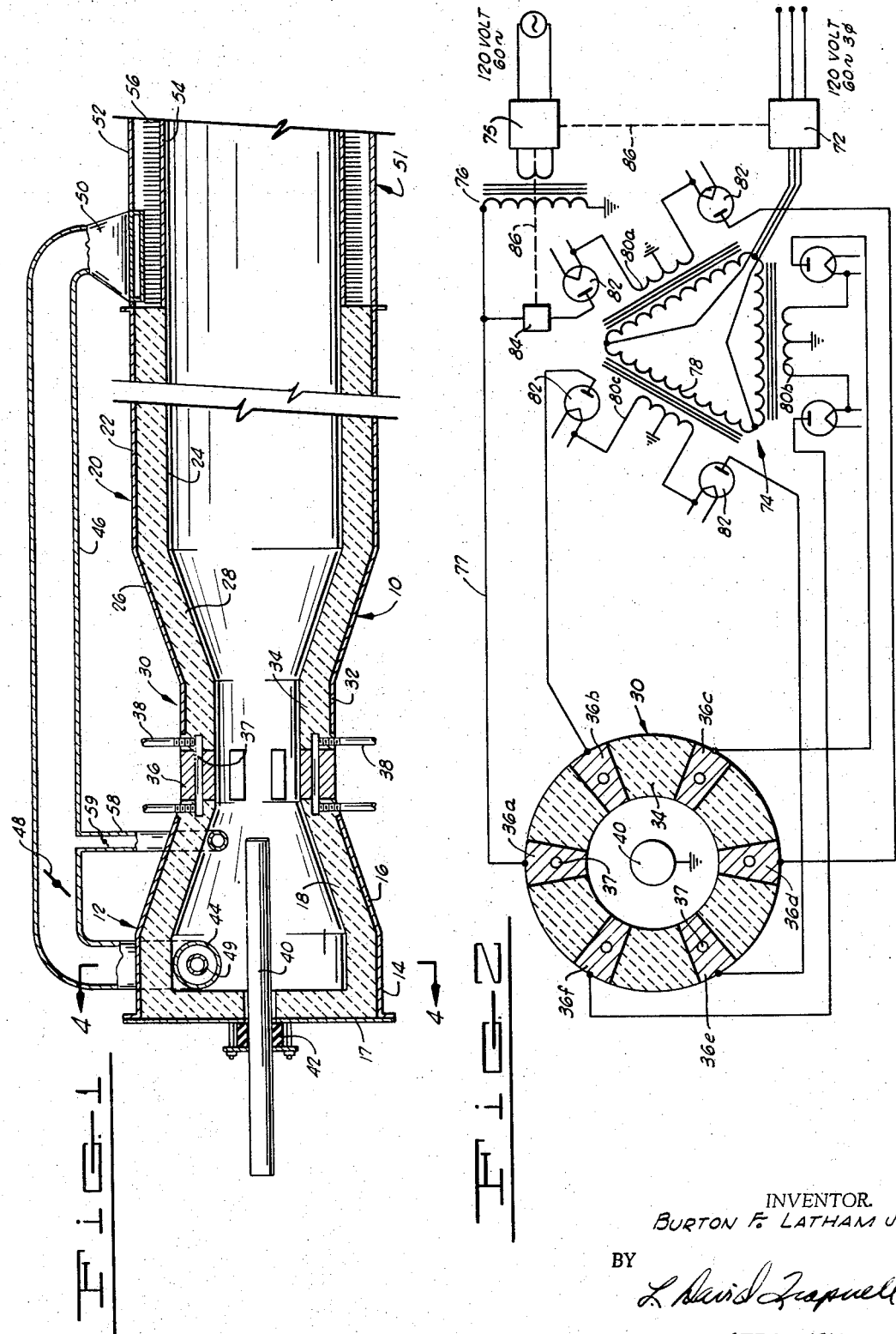
INVENTOR.
BURTON F. LATHAM JR.
BY
L. David Trapnell
ATTORNEY

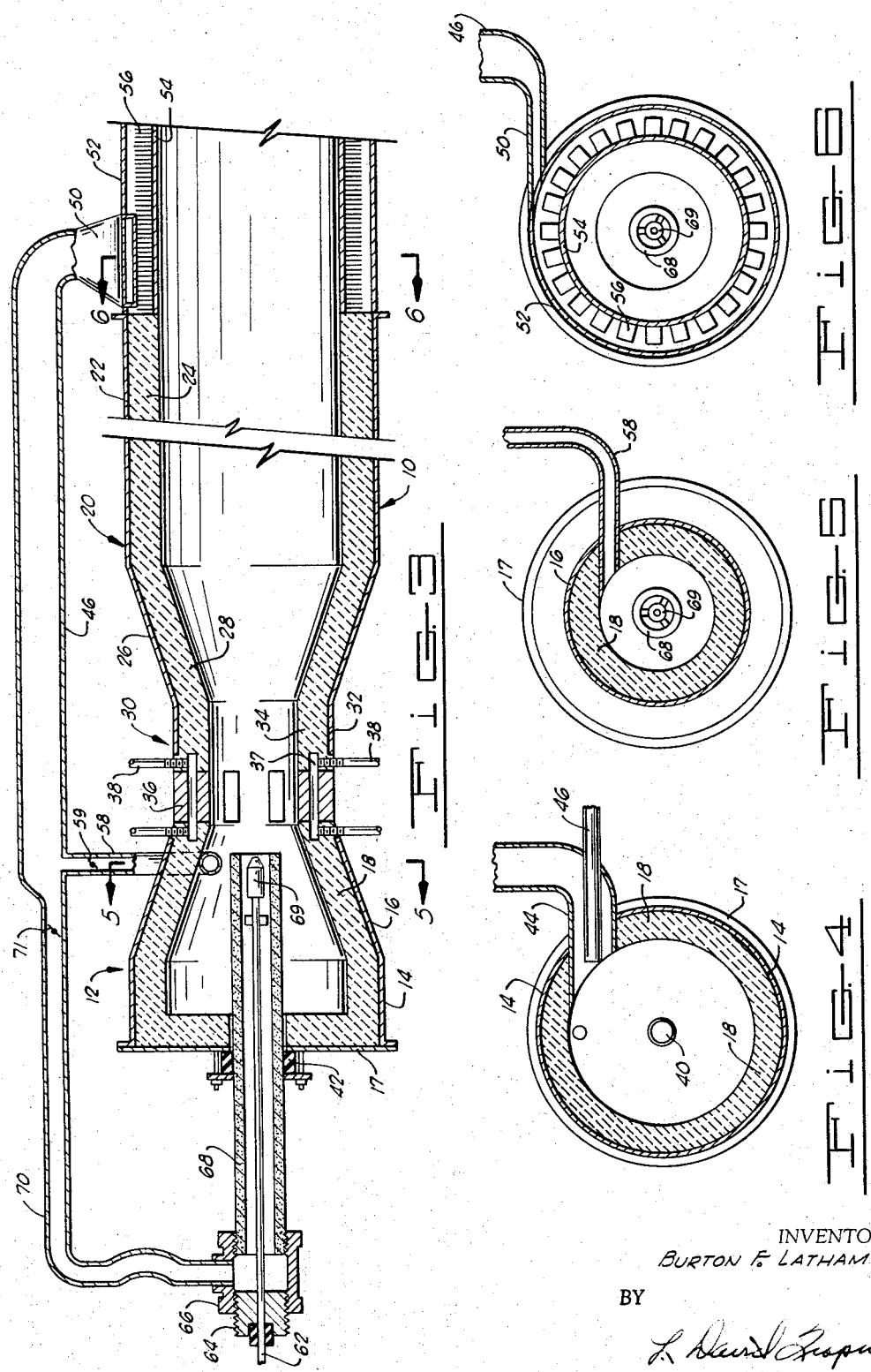

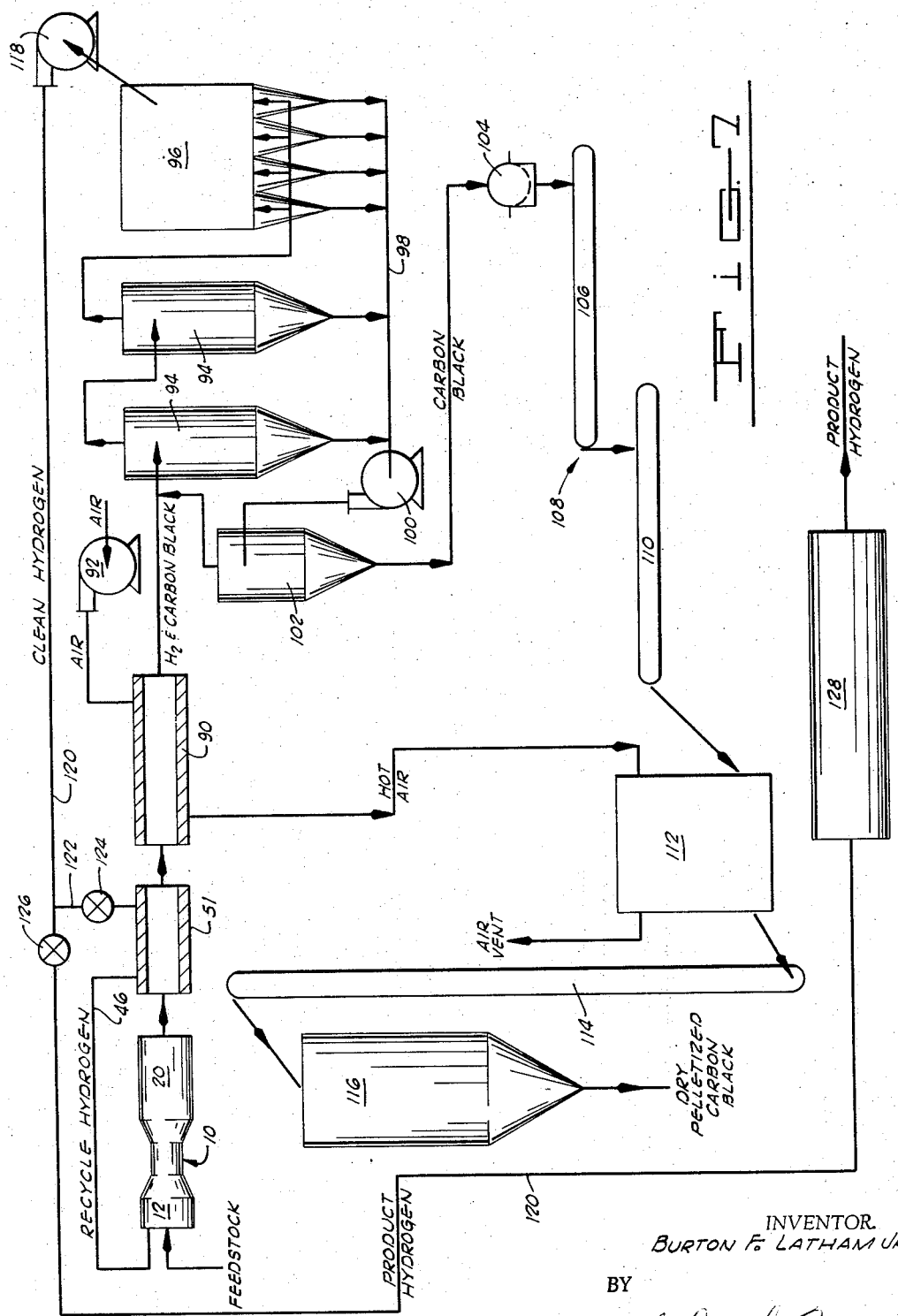

3,344,051
METHOD FOR THE PRODUCTION OF CARBON BLACK IN A HIGH INTENSITY ARC
Burton F. Latham, Jr., Houston, Tex., assignor to Continental Carbon Company, Houston, Tex., a corporation of Delaware
Filed Dec. 7, 1964, Ser. No. 416,212
11 Claims. (Cl. 204—173)

This invention relates to an improved method for producing carbon black, and more particularly, to an improvement in electric arc processes used to produce finely divided carbon black.

A relatively recent process which has been utilized for producing carbon black employs a high intensity electric arc which develops a high temperature, high velocity plasma jet of dissociated and ionized gases. The carbon black feedstock is passed through the arc and is cracked by the high temperature to yield carbon and hydrogen in elemental form. The hierarc process, as this technique has come to be called, permits high grade carbon black to be economically produced without the necessity for burning a portion of the hydrocarbon feedstock to crack the remainder of the feedstock to the desired product.

In electric arc processes, two techniques have previously been employed for stabilizing the arc. In the so-called fluid stabilized arcs, the zone between the cathode and anode is located near the axis of a high velocity fluid vortex formed by the ionized and dissociated gases. The relatively slowly moving gas in the center of the vortex forms a path of least resistance to the flow of electrons because the ionized gas in the center of the vortex is not carried away as rapidly as the gas toward the outside of the vortex. Electrons moving between the electrodes thus tend to follow the lower resistance path causing more ions to be formed along this relatively narrow path. This action is termed vortex pinch effect, and the energy dissipated by the electrons in penetrating the vortex axis is used to dissociate and ionize the gases in the vortex surrounding the axis. Since a very narrow zone of extremely high temperature is attained down the vortex axis in a fluid stabilized plasma arc, some of the carbon black feedstock passing through the zone in which the arc is located at a position relatively close to the outside of the vortex fails to contact the relatively high temperature portion of the arc along the axis of the vortex and may therefore be incompletely cracked.

The second method of stabilizing the plasma arc is by the so-called high intensity technique in which the current density at the tip of the anode is raised to a much higher level than is used in the fluid stabilization technique. The requirement of a high velocity fluid vortex is obviated in high intensity stabilization. The concentration of electrons bombarding the anode, and the energy expended in the area of impingement of the electrodes thereon is such that the anode commences to vaporize rapidly, and there is a balance reached between vaporized molecules leaving the anode, and electrons penetrating the surface of the anode. Thus, most of the voltage drop between the cathode and anode is across the so-called anode fall area, which is the area adjacent and surrounding the anode tip. As opposed to the fluid stabilized arc in which most of the energy of the arc is delivered to the gas forming the vortex, in the high intensity stabilized arc, the electrons follow a broader flow path of relatively lower resistance, and most of the electrical energy is expended in the anode fall area for vaporizing, dissociating and ionizing the material making up the anode.

The flame velocity in the center of the plasma flame in the high intensity stabilized arc is very much lower than the flame velocity in the typical fluid stabilized arc and thus materials passed through the arc are permitted to remain in the high temperature zone for longer periods of time. Because of the broader zone of high temperature which is characteristic of the high intensity stabilized arc, and the relatively lower velocity of movement of flame and ionized gases through the high intensity arc, it is preferred to employ this type of arc stabilization when using the electric arc for producing carbon black.

One of the problems which has characterized the use of the high intensity arc in carbon black production, however, has been the difficulty of completely filling or occupying with the high temperature arc flame, the zone through which the carbon black feedstock must pass. Where the path between the cathode or cathodes and the anode extends from one side of a constricted thoat to a point located on the axis thereof, there is a tendency of the carbon black feedstock to bypass the portion of the flame which is at the highest temperature, and to thus be incompletely cracked, or for a lack of homogeneity to result in the carbon black particles produced by passage through the flame.

The present invention provides a high intensity electric arc which is caused to emanate in rapid sequence from points spaced circumferentially about the periphery of a constricted neck or throat through which is passed at a relatively low velocity, a vortex comprising a carbon black feedstock and a suitable inert carrier gas. The gas velocity in the vortex passed through the constricted throat containing the tail flame of the plasma arc is below the point which would tend to develop fluid stabilization in the arc. Rather, the greatest portion of the voltage drop in the arc is expended across the anode fall area.

The electrical circuitry which is employed to supply the electrical energy of the arc produces high intensity discharges in rapid sequence from a plurality of cathodes spaced circumferentially from each other around the restricted throat to a carbon anode located on the axis of the throat upstream from the cathodes. The effect of this distribution of the arc paths is to fill the throat completely with the plasma flame so that all of the feedstock passing therethrough is uniformly and substantially completely cracked to carbon black.

In a specific embodiment of the invention, a furnace type carbon black reactor is employed and includes an enlarged upstream end, a soaking chamber downstream therefrom and a constricted neck or Venturi throat interconnecting the upstream end of the reactor with the soaking chamber. A carbon anode is positioned in the upstream end of the reactor and terminates in a free end which is positioned relatively close to the Venturi throat. Six cathodes are mounted in spaced relation around the throat adjacent the interior thereof and are connected through rectifiers and a three-phase delta transformer to a source of three-phase alternating current. Each branch of the secondary winding of the three-phase transformer is provided with a center tap, and is connected at each of its ends through a rectifier to one of the cathodes so that the peak pulsating direct current flow from the cathodes to the anode shifts from one of the cathodes to the next adjacent cathode around the throat in 1/360 of a second. The cycle of discharge from all of the cathodes around the throat is therefore effected in 1/60 of a second.

Means are provided in the enlarged upstream end of the reactor for introducing a suitable hydrocarbon feedstock into the reactor in a direction such that flow through the Venturi throat is either primarily vortical or primarily axial. The feedstock is carried through the Venturi throat and into the soaking chamber by an inert carrier gas which can be introduced to the enlarged upstream end of the reactor either tangentially or axially, but is preferably introduced, at least in part, tangentially in order to provide a low velocity, inert gas vortex moving through the Venturi throat. The inert gas functions to direct the hydrocarbon feedstock into the tail flame of the high intensity arc, to shield the walls of the reactor from excessive heat and coke deposition, to aid in controlling the particle size of the carbon black product, and to quick-quench the carbon black product to prevent chemical recombination of the dissociated hydrocarbon feedstock in the soaking chamber. In a preferred embodiment of the invention, hydrogen gas extracted from the effluent emanating from the discharge end of the reactor is recycled to the enlarged upstream end thereof. In this way, the inert carrier gas which is required is economically provided, and the hydrocarbon feedstock is moved by the recycle hydrogen through the Venturi throat which is filled with the tail flame of the high intensity electric arc, and is efficiently cracked to carbon and hydrogen.

From the foregoing description of the invention, it will be perceived that an important object of the invention is to provide an improved method for producing carbon black, which method is very economical due to the employment of a high intensity electric arc for cracking substantially all of the carbon black feedstock.

An additional object of the invention is to provide an improved hierarc process for producing carbon black in which the flame produced by the arc fills a restricted throat portion of the carbon black reactor, and is of a more uniformly high temperature than the types of high intensity arcs heretofore used in such processes.

An additional object of the present invention is to provide a novel apparatus for producing carbon black using a high intensity stabilized, rotating electric arc for supplying the energy required to crack the hydrocarbon feedstock to the desired products.

An additional object of the present invention is to provide an improved method for producing carbon black, in which method the inert carrier gas required to move the feedstock through the carbon black reactor is recycled hydrogen gas derived from the product effluent gases developed in the production of the carbon black.

In addition to the foregoing objects and advantages, additional meritorious salient features of the invention will be perceived as the following detailed description of the invention is read in conjunction with the accompanying drawings which illustrate certain exemplary embodiments of the invention.

In the drawings:

FIGURE 1 is an axial sectional view through the longitudinal axis of a high intensity electric arc carbon black reactor constructed in accordance with this invention. The embodiment of the reactor illustrated in FIGURE 1 is designed to crack a gaseous hydrocarbon such as natural gas to produce the desired carbon black product.

FIGURE 2 is a composite sectional view and wiring diagram illustrating the manner in which a source of electrical energy is connected through novel electrical circuitry to the cathodes disposed in the Venturi throat of the reactor shown in FIGURE 1. The cathodes are illustrated as they appear in section along a plane passed transversely through the Venturi throat of the reactor.

FIGURE 3 is an axial sectional view of a high intensity electric arc carbon black reactor similar to the reactor illustrated in FIGURE 1, but constructed in modified form to permit a liquid hydrocarbon feedstock to be cracked to carbon black.

FIGURE 4 is a view in section taken along line 4—4 of FIGURE 1 showing the tangential inlet for natural gas and recycle hydrogen gas into the carbon black reactor designed to crack natural gas as illustrated in FIGURE 1.

FIGURE 5 is a sectional view taken along line 5—5 of FIGURE 3 and illustrating the auxiliary recycle hydrogen inlet to the reactor.

FIGURE 6 is a sectional view taken along line 6—6 of FIGURE 3 and illustrating the tangential outlet for recycle hydrogen gas from the fin-tube preheater section illustrated in FIGURES 1 and 3.

FIGURE 7 is a flow diagram illustrating a complete carbon black process in which hydrogen gas produced in the carbon black reaction is recycled to the reactor and utilized as the inert carrier gas for moving the feedstock through the high intensity electric arc.

Referring now to the drawings in detail, and particularly to FIGURE 1, a carbon black reactor employing a high intensity ionizing electrical discharge for cracking a carbon black feedstock is designated generally by reference character 10. The reactor 10 includes an enlarged upstream end portion 12 which includes a generally cylindrical metallic outer shell 14 at the end thereof, and a frusto-conical metallic outer shell 16 connected to, or formed integrally with, the cylindrical metallic shell 14 and tapering inwardly therefrom toward the axis of the reactor 10. The enlarged upstream end portion 12 of the reactor 10 is closed by a metallic cover plate 17 and is lined with a suitable refractory material 18 such as precast silica carbide.

An elongated, generally cylindrical soaking chamber 20 is provided at the downstream end of the reactor 10 and comprises a generally cylindrical outer metallic shell 22 having a refractory lining 24. A frusto-conical section of the reactor extends immediately upstream from the soaking chamber 20 and includes an outer metallic shell 26 and refractory lining 28.

Positioned intermediate the upstream end portion 12 of the reactor 10 and the soaking chamber 20 thereof is a Venturi throat 30. The Venturi throat 30 is immediately adjacent and between the frusto-conical sections of the reactor 10 and places these sections in communication with each other. The Venturi throat 30 is generally cylindrical in transverse cross-sectional configuration and is surrounded over a portion of its length by an outer metallic shell 32. A suitable refractory material 34 lines the Venturi throat 30, and a plurality of circumferentially spaced cathodes 36 are mounted in the refractory material in the upstream end of the throat between the ends of the outer metallic shells 16 and 32. The refractory material thus insulates the cathodes 36 from each other and from the electrically conductive metallic shells.

Preferably, six of the cathodes 36 are provided and are spaced substantially equidistantly from each other around the Venturi throat 30. In a preferred construction of the cathodes 36, these elements are made of copper and are provided with axially extending holes 37 which permit water to be circulated therethrough from suitable supply pipe 38 for the purpose of cooling the cathodes during the operation of the reactor.

A graphite anode 40 extends through a suitable electrically insulating seal 42 in the cover plate 17 into the upstream end portion 12 of the reactor 10 and projects along the axis of the reactor as illustrated in FIGURE 1. The inner end of the graphite anode 40 is positioned a short distance upstream from the cathodes 36. As will be hereinafter explained, suitable apparatus (not shown) may be provided outside the reactor 10 for moving the anode 40 axially into the reactor to maintain the spatial relationship between the tip of the anode and the cathodes 36 as the anode is consumed during operation of the high intensity electric arc.

Entering the enlarged upstream end portion of the reactor 10 is a recycle hydrogen primary inlet conduit 44 (see FIGURES 1 and 4). The primary inlet conduit 44 extends at one of its ends through the outer metallic shell 14 and the ceramic 18 in a tangential direction to impart a spiralling or vortical flow to the recycle hydrogen gas introduced to the reactor. The other end of the primary inlet conduit 44 is connected to a recycle hydrogen duct 46 through a suitable control valve 48. A natural gas inlet pipe 49 extends into the recycle hydrogen gas primary inlet conduit 44 at a point outside the reactor 10 and passes into the reactor concentrically inside said primary inlet conduit.

The recycle hydrogen duct 46 is connected through a tangential outlet 50 to a fin-tube section 51. The fin-tube section 51 includes an outer metallic shell 52, an inner metallic shell 54 and a plurality of fins 56 which are secured to the inner shell and extend radially into the annulus defined between the inner and outer shells. A recycle hydrogen auxiliary inlet conduit 58 communicates with the recycle hydrogen duct 46 and extends tangentially into the reactor 10 in the frusto-conical section of the enlarged upstream end portion 12. A suitable valve 59 is provided in the auxiliary inlet conduit 58 for controlling the flow of hydrogen gas therethrough.

The embodiment of the carbon black reactor 10 illustrated in FIGURE 3 is similar to the embodiment used for cracking natural gas to hydrogen and carbon black and illustrated in FIGURE 1, but is adapted to the use of a liquid hydrocarbon feedstock. Identical reference numerals have been employed in the two figures to designate identical elements of each system. For the purpose of introducing a liquid hydrocarbon to the reactor shown in FIGURE 3, a hydrocarbon injection pipe 62 extends through an electrically insulating plug 64 in a T-fitting 66 which is connected to a hollow or tubular graphite anode 68. The hollow graphite anode 68 with the feedstock injection pipe 62 positioned concentrically therein extends into the enlarged upstream end portion 12 of the reactor 10, and terminates in the previously described spaced relation to the cathodes 36. A suitable atomizing spray nozzle 69 is secured to the inner end of the feedstock injection pipe 62 adjacent the end of the hollow graphite anode 68. A recycle hydrogen primary inlet conduit 70 is connected to the T-fitting 66 at one of its ends, and is connected through a control valve 71 to the recycle hydrogen duct 46 at its other end.

The electrical circuitry which is used to produce the rotating high intensity electric arc employed in the present invention is best illustrated in FIGURE 2 of the drawings. A source of three-phase, 60-cycle, 120 volt alternating current is connected through a main three-phase power transformer switch 72 to a three-phase main power delta transformer 74. A starter transformer switch 75 is connected to a single-phase, 60-cycle 120 volt A.C. source and is used to open and close an electrical circuit through a starter transformer 76. The starter transformer 76 is connected by electrical lead 77 to one of the cathodes 36 which, for purposes of explanation, has been designated as cathode 36a in FIGURE 2. The other five cathodes 36 which are spaced circumferentially around the Venturi throat 30 are designated by reference numerals 36b through 36f in FIGURE 2.

The main three-phase delta transformer 74 is provided with a tapped primary winding 78 and with sliding contacts (not shown) so that the number of turns in each of three branches of the delta transformer primary can be varied together in synchronization to control the voltage output from the transformer. Impedance is built into the three-phase delta transformer so as to limit the maximum current that can be drawn by the transformer to the amount desired. The delta transformer 74 is further provided with three secondary winding branches 80a, 80b and 80c which are each grounded through a center tap and each connected at its opposite ends to the cathodes of a suitable rectifier tube 82.

The plates of each of the rectifier tubes 82 are each connected to a different one of the cathodes 36a–36f in the Venturi throat 30 with the arrangement being such that each pair of rectifier tubes associated with each of the branches 80a, 80b and 80c of the delta transformer secondary winding are connected to two adjacent cathodes in the Venturi throat. As will be perceived in referring to FIGURE 2, one of the rectifier tubes 82 associated with the branch 80a of the transformer secondary 80 is connected through an isolation switch 84 to the electrical lead 77 connecting the starter transformer 76 with the cathode 36a. A suitable mechanical linkage 86 is connected to the switches 72, 75 and 84 and is employed to throw these switches in the manner hereinafter described.

*Operation*

Operation of the reactor illustrated in FIGURE 1 and of the electrical circuitry associated therewith and illustrated in FIGURE 2 as they are used for the purpose of cracking natural gas to carbon black proceeds as follows. The enlarged upstream end portion 12 and the Venturi throat 30 are filled with inert carrier gas so as to displace air therefrom. The carrier gas is preferably hydrogen gas collected in a suitable cylinder or tank (not shown) and produced during a previous operation of the reactor as hereinafter described. As the inert carrier gas is continuously introduced to the reactor 10, an electric arc is struck between the cathodes 36 and the anode 40.

In striking the arc, the mechanical linkage 86 is thrown to a start position which closes the starter transformer switch 75 but permits the three-phase transformer switch 72 and the isolating switch 84 to remain open. The starter transformer 76 is thus energized and develops a high voltage alternating current in the lead 77 and between cathode 36a and the anode 40. The high voltage, relatively low, alternating current occurring between the cathode 36a and the anode 40 partially ionizes the gas between these electrodes, and thus reduces the gas gap resistance between the cathodes and anode.

The mechanical linkage 86 is held in the described starting position for a suitable period of time, such as approximately 30 seconds, to assure that ionization of the gas between the electrodes will occur to an extent sufficient to permit the low voltage high current arc to be started without moving the anode closer to the cathodes. The starter transformer 28 is designed with built-in impedance to limit the starting current to around 58 milliamperes and to thus protect this transformer from overloads. It will be understood by those skilled in the art that a suitable filament transformer (not shown) should be connected to the filaments of the rectifier tubes 82 and energized while the mechanical linkage 86 is in the starting position. This will permit the filaments of the rectifier tubes 82 to be heated during this period and prior to the time that high current is passed between the filaments and the plates of the rectifier tubes from the secondary windings of the delta transformer 74.

After sufficient ionization of the gas between the electrodes has occurred, the mechanical linkage 86 is next thrown to the operating position in which the isolation switch 84 is closed, the starter transformer switch 75 is opened, and the main three-phase power transformer switch 72 is closed. At or slightly prior to this time, the natural gas carbon black feedstock is introduced to the reactor by way of the pipe 49 which extends concentrically through the recycle hydrogen primary inlet conduit 44 into the enlarged upstream end portion 12 of the reactor 10. When the mechanical linkage 86 has been thrown to the operating position as described, the three-phase power transformer 74 is energized so that a high intensity pulsating direct current is delivered by each of the rectifier tubes 82 and the supply voltage is stepped down to an operating voltage of from 50 volts to 110 volts. Pulsating high intensity direct current arcs are produced from the cathodes 36a–36f to the anode 40 as hereinafter described.

The function of the three-phase power transformer 74 and its associated rectifier tubes 82 is to provide a consecutive or sequential peak current discharge to the anode 40 from the six cathodes 36a–36f disposed around the Venturi throat 30. The peak electron flow in the arcs commences with one of the rectifier tubes 82 associated with one of the branches of the secondary winding, say 80a, of the main three-phase delta power transformer 74. The pulsating direct current flows from this rectifier tube 82 to one of the cathodes, say 36a, and crosses the arc gap to the grounded anode 40, and then returns through the grounded center tap of the secondary winding branch 80a. The rectifier tube 82 which is connected to the opposite end of the same secondary winding branch 80a is non-conducting at this time. 1/360 of a second later, the initially conducting rectifier tube 82 becomes non-conducting and the rectifier tube at the opposite end of the same branch 80a of the transformer secondary becomes conducting. The same time interval elapses in consecutive sequence between the conducting status of each of the six rectifier tubes 82 which are positioned around the three-phase transformer 74 in groups of two in association with each of the three branches 80a, 80b and 80c of the secondary windings.

It will thus be noted that 1/360 of a second is required to have the peak current shift from one of the cathodes 36 to the next adjacent cathode, and that a total time lapse of the 1/60 of a second is required for the peak current of the high intensity arc discharge to move completely around the six cathodes disposed in the Venturi throat. This very rapidly revolving high intensity arc results in the entire space within the Venturi throat 30 being filled with the plasma tail flame emanating from the anode fall area. As the end of the anode 40 is vaporized during operation of the arc, it should be moved inwardly into the reactor 10 to maintain the original spatial relationship between the anode and the cathodes 36a–36f. This can suitably be accomplished with a gear motor (not shown) operated by a controller which responds to the current-voltage characteristic of the arc so as to maintain the same spacing at all times between the anode 40 and cathodes 36a–36f.

The tangential introduction of preheated recycle hydrogen gas to the enlarged upstream end portion 12 of the reactor 10 results in the formation of a layer of hydrogen gas along the refractory lined Venturi throat 30 to prevent coke formation on the refractory material. Natural gas, partially mixed with and carried by the recycle hydrogen gas, passes through the tail flame of the electric arc which is centered in and fills the Venturi throat 30. In the Venturi throat 30, the natural gas feedstock is quickly cracked to hydrogen and carbon black by the very high temperature of the tail flame. As the hydrogen and carbon black products of the cracking, along with the recycle hydrogen gas, move out of the Venturi throat 30, the gases serve to quick-quench the tail flame and to prevent recombination of the dissociated natural gas. The ratio of the natural gas feed rate to the electrical power input is used to control the average temperature of the tail flame in the Venturi throat 30, and to control the particle size and shape of the carbon black product. An average temperature in the range of from about 2000 to about 3500° F. is generally developed in the Venturi throat 30, with a range of from 2500° F. to 3000° F. being preferred.

In the elongated soaking chamber 20 which is provided downstream from the Venturi throat 30, the extractable (high molecular weight) hydrocarbons adhering to the surface of the carbon black particles are removed from the particles by thermal decomposition. The exhaust hydrogen gas with the carbon black particles suspended therein then passes through the fin-tube section 51 disposed downstream from the soaking chamber 20. Hydrogen gas, extracted from the effluent in a manner hereinafter described, is recycled through the annulus between the outer shell 52 and the inner shell 54 in contact with the fins 56 of the fin-tube section 51 for the purpose of transferring a substantial portion of the residual heat of the effluent gases to the recycled hydrogen gas. The recycle hydrogen gas leaves the fin-tube section 51 through the tangential outlet 50 and is delivered by duct 46 to the conduits 44 and 58. A more detailed discussion of the treatment and disposition of the effluent reaction products from the reactor 10 will be deferred to a later point in the description of the invention.

In the event that a liquid hydrocarbon feedstock is to be employed instead of the natural gas feedstock used in the reactor embodiment illustrated in FIGURE 1, the liquid hydrocarbon is introduced to the enlarged upstream end portion 12 of the reactor 10 through the feedstock injection pipe 62 as shown in FIGURE 3. As previously explained, the feedstock injection pipe 62 extends concentrically through a hollow graphite anode 68 and both the hollow anode and the nozzle 69 carried at the inner end of the feedstock injection pipe 62 terminate in relatively close proximity to the Venturi throat 30. Recycle hydrogen gas is conveyed by conduit 70 from the duct 46 to the T-fitting 66 and from this fitting enters the hollow interior of the anode 68. From the end of the hollow anode 68, the atomized feedstock and recycle hydrogen gas pass through the tail flame in the Venturi throat 30 in the manner previously explained. It should be pointed out that the reactor embodiment illustrated in FIGURE 3 can also be employed when natural gas is the available feedstock. In this event, the nozzle 69 is removed and the gas is introduced through the feedstock injection pipe 62.

The flow of the carbon black feedstock, recycle hydrogen, and reactor effluent, and the disposition of the several reaction products from the reactor 10 can best be understood and summarized by referring to the overall flow diagram illustrated in FIGURE 7. The carbon black feedstock is introduced to the enlarged upstream end 12 of the reactor 10 and is cracked by the high intensity electric arc to carbon black and hydrogen. The extractable hydrocarbon remaining on the surface of the solid carbon black particles is decomposed by heat in the soaking chamber 20 prior to passage of the hydrogen and suspended carbon black particles in the form of an aerosol into the fin-tube section 51 which functions as a heat exchange device for cooling the reactor effluent and heating recycle hydrogen gas. The effluent hydrogen gas and carbon black mixed therewith then pass to a second fin-tube section 90 in which the effluent aerosol is further cooled by heat exchange with cooling air circulated from a suitable fan or blower 92.

The cooled hydrogen and suspended carbon black pass from the fin-tube section 90 through a carbon black collecting system preferably comprising a plurality of cyclone separators 94 and a bag filter 96 located downstream from the cyclones. The carbon black which is separated from the effluent aerosol in the cyclone separators 94 and the bag filter 96 is moved by a pneumatic conveyor system 98 including a blower 100 into a settling tank cyclone 102 where the loose carbon black is separated from the conveying air and residual hydrogen gas. This separated gaseous mixture is introduced from the settling tank cyclone 102 to the effluent stream flowing from the fin-tube section 90 to the first cyclone separator 94.

Carbon black from the settling tank cyclone 102 is passed through a grit pulverizer 104 to the first stage 106 of a wet pelletizing box 108 where the carbon black is mixed with water and agglomerated to pellet form. The wet pellets then drop into the polishing stage 110 of the wet pelletizing box 108 where the pellets are polished and made firmer. The polished wet pellets are fed to a drying drum 112 where they are contacted by hot air from the fin-tube section 90 and dried. The dry pellets from the drying drum 112 are lifted by a suitable elevator 114 to a storage tank 116 which may be a hopper type of container suitable for use in transferring the pellets to hopper cars, paper bags or any other suitable form of ultimate disposal.

The hydrogen gas which is separated from the carbon black particles in the bag filter 96 is propelled by a blower 118 through a conduit or duct 120. The flow of clean hydrogen through the duct 120 is divided by means of the recycle hydrogen conduit 122 containing a recycle valve 124, and by means of product valve 126 located in the duct 120. Thus, a portion of the clean hydrogen delivered by the blower 118 is recycled to the fin-tube section 51 for preheating prior to recycling to the reactor 10 for use as the inert carrier gas therein. The remaining portion of the clean hydrogen gas delivered by the blower 118 is transmitted to a suitable hydrogen processing plant 128 where the gas is further purified, compressed and placed in suitable storage cylinders.

While certain illustrative embodiments of the invention have been shown and described herein, it will be readily understood that the invention should not properly be limited to these illustrative embodiments, since various modifications and innovations can be made in the structure illustrated and the steps described without departure from the spirit and scope of the invention.

What is claimed is:

1. In a process for producing carbon black by passing a hydrocarbon through a plasma flame produced by a high intensity ionizing electrical discharge, the improvement which comprises producing said plasma flame in a Venturi throat by passing high intensity electric arcs consecutively and in rapid succession from a plurality of spaced cathodes mounted circumferentially about said throat to an anode axially disposed therein whereby the interior of the throat is effectively filled continuously with a plasma flame; and moving the hydrocarbon through said throat with an inert carrier gas at a velocity below that at which fluid stabilization of said electric arcs occurs.

2. The improvement claimed in claim 1 wherein said inert carrier gas is hydrogen gas derived from the cracking of said hydrocarbon compound as the hydrocarbon compound is passed through said plasma flame.

3. The improvement claimed in claim 1 wherein the carbon black and hydrogen gas produced by cracking said hydrocarbon are passed in heat exchange relation to the hydrogen gas used as said inert carrier gas.

4. The improvement claimed in claim 1 wherein said carrier gas and said hydrocarbon are passed through said Venturi throat in a vortical movement.

5. The improvement claimed in claim 1 wherein six of said cathodes are employed and are spaced substantially equidistantly from each other around said throat, and wherein said electric arcs are each pulses of direct current.

6. The improvement claimed in claim 1 and further characterized to include the step of initially reducing the resistance of the gap between said cathodes and said anode before passing said high intensity electric arcs therethrough by using a relatively high voltage, low alternating current to produce an electric arc from one of said cathodes to said anode.

7. A carbon black manufacturing process comprising:

substantially completely filling a zone of restricted volume with a plasma flame produced by consecutively passing a plurality of high intensity, pulsating direct current electric arcs to an anode axially disposed in said zone from a plurality of spaced cathodes positioned circumferentially around the periphery of said zone;

continuously introducing a carbon black feedstock and an inert carrier gas to a zone of larger volume than said zone of restricted volume and in open communication therewith;

continuously moving said inert carrier gas and feedstock through the plasma flame in said restricted volume zone into a communicating soaking zone of larger volume than said restricted volume zone, said inert carrier gas and said feedstock being moved at a velocity below that of which fluid stabilization of said electric arc occurs;

cooling the carbon black and hydrogen gas produced by the cracking of said feedstock in said plasma flame; and separating the carbon black from the hydrogen gas.

8. The process claimed in claim 7 wherein said inert carrier gas is recycled hydrogen gas.

9. The process claimed in claim 7 wherein at least a portion of said inert carrier gas is tangentially introduced, and wherein said carbon black feedstock is a liquid hydrocarbon introduced axially.

10. The process claimed in claim 7 wherein said carbon black is pelletized after separation from said hydrogen gas, using water to agglomerate the carbon black into pellets; and wherein air is passed in indirect heat exchange relationship with the carbon black and hydrogen produced in the plasma flame to effect said cooling and then into contact with the wet pellets of carbon black to dry said pellets.

11. The process claimed in claim 7 wherein the ratio of the electrical power input to said cathodes to the rate of feedstock introduction to said anode containing zone is controlled to provide a temperature of from about 2000° F. to about 3000° F. in said restricted volume zone.

References Cited

UNITED STATES PATENTS 3,073,769   1/1963   Doukas _____ 204—171

JOHN H. MACK, *Primary Examiner.*

R. MIHALEK, *Assistant Examiner.*